United States Patent

[11] 3,610,435

| [72] | Inventors | Robert W. Randolph;<br>Dallas W. Rollins, both of St. Charles, Mo. |
|---|---|---|
| [21] | Appl. No. | 880,020 |
| [22] | Filed | Nov. 26, 1969 |
| [45] | Patented | Oct. 5, 1971 |
| [73] | Assignee | ACF Industries, Incorporated<br>New York, N.Y. |

[54] COUPLER POSITIONING DEVICE FOR LONG LENGTH RAILWAY FREIGHT CARS
8 Claims, 10 Drawing Figs.

[52] U.S. Cl. ............................................. 213/15
[51] Int. Cl. ............................................. B61g 7/12
[50] Field of Search ............................. 213/15, 19, 20, 21

[56] References Cited
UNITED STATES PATENTS
1,231,619  7/1917  Krakau ........................ 213/15
3,365,078  1/1968  Hathorn et al. ............... 213/15
3,478,895  11/1969  Cseri ........................... 213/15

*Primary Examiner*—Drayton E. Hoffman
*Attorney*—Eugene N. Riddle

ABSTRACT: A coupler positioning device for long length railway freight cars comprising an elastomeric member having an upper surface connected to the shank of a coupler for lateral movement therewith. The lower surface of the elastomeric member is operatively connected to the adjacent truck and moves with the truck upon a pivotal movement of the truck relative to the car body or center sill. The elastomeric member deflects in shear upon any relative lateral movement between the truck and the coupler shank. After the shear deflection of the elastomeric member the coupler shank and truck are urged by the bias of the elastomeric member to longitudinally aligned relation.

INVENTORS.
ROBERT W. RANDOLPH
DALLAS W. ROLLINS
BY Eugene N. Riddle
ATTORNEY

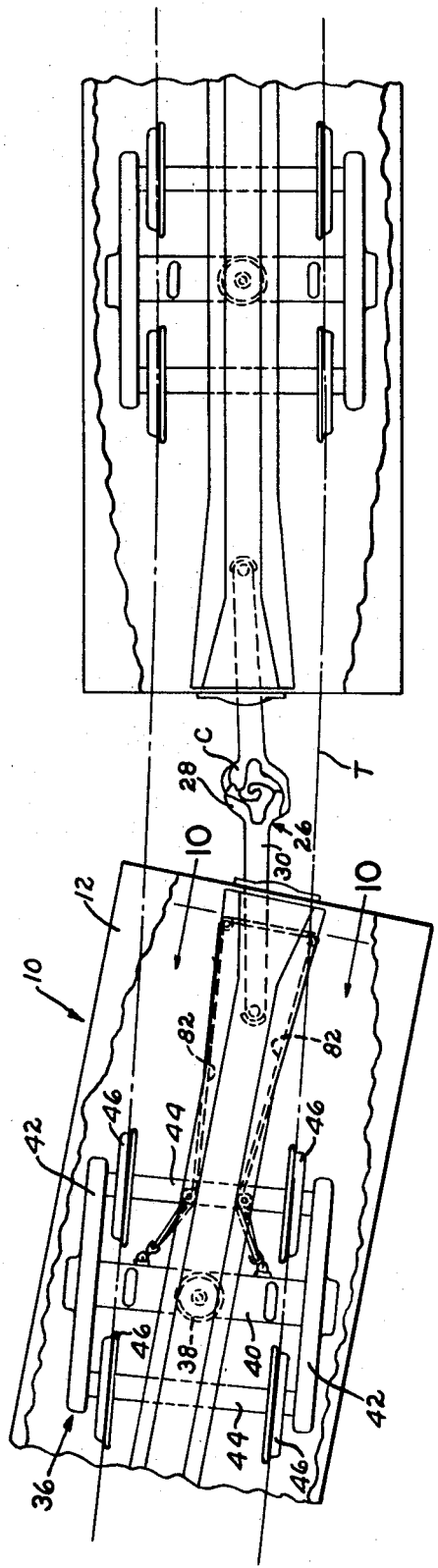

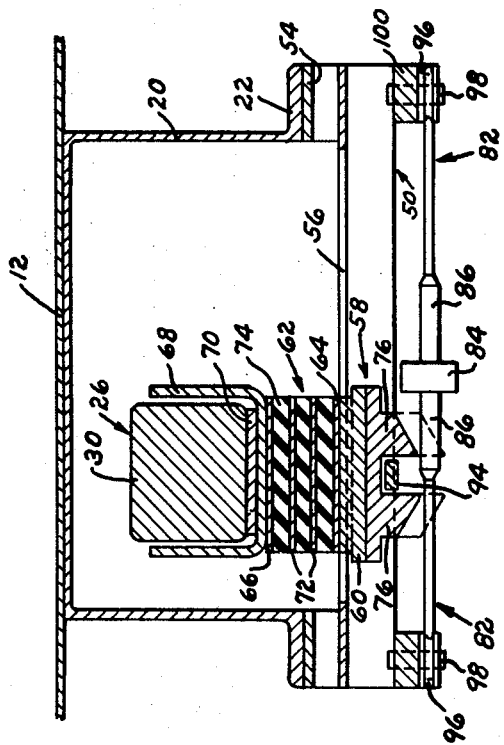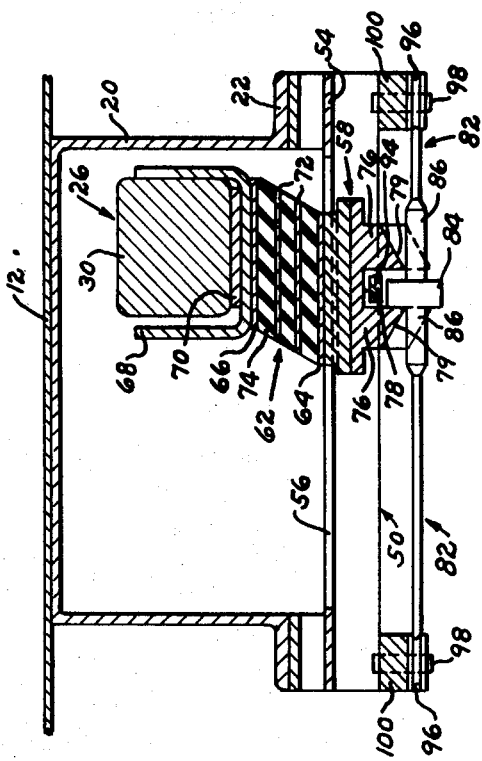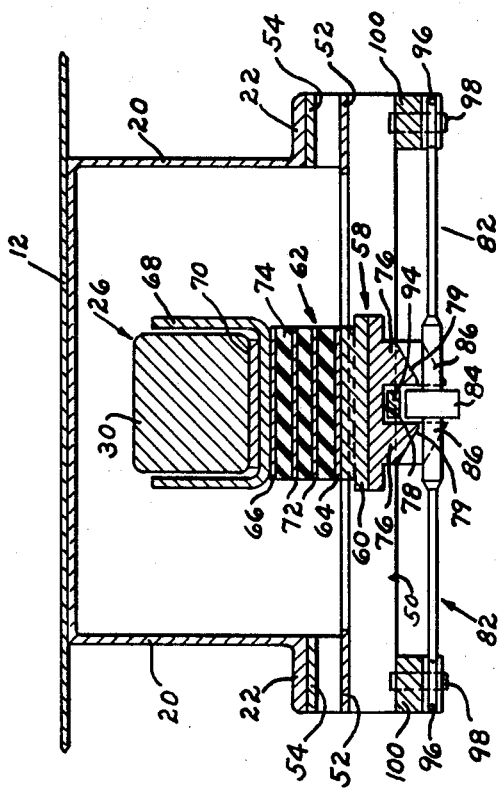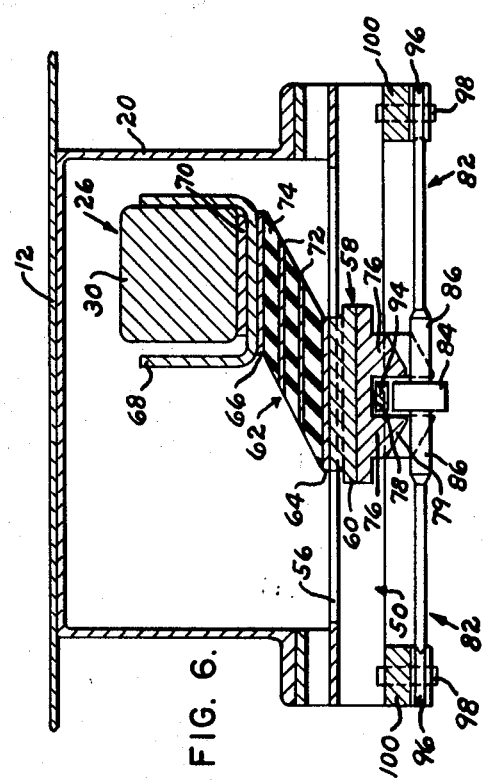

COUPLER POSITIONING DEVICE FOR LONG LENGTH RAILWAY FREIGHT CARS

BACKGROUND OF THE INVENTION

Copending application Ser. No. 95,878 filed Dec. 7, 1970, a continuation of application Ser. No. 801,921 filed Feb. 7, 1969, now abandoned and entitled "Coupler-Centering Device for Railway Cars" discloses a coupler-centering device in which an elastomeric member is employed having an upper surface connected to a coupler shank for deflecting in shear upon lateral swinging of the coupler. However, the lower surface of the elastomeric member is supported on the coupler carrier and is held against any movement along the coupler carrier. The bias of the elastomeric member in said copending application returns the coupler to centered position with respect to the longitudinal axis of the center sill after the shear deflection of the elastomeric member.

In addition, spring and rod arrangements have been employed heretofore in a railway car for connecting a coupler for swinging movement with the truck as shown in U.S. Pat. No. 3,365,078. Such arrangements, however, are cumbersome and costly.

BRIEF DESCRIPTION OF THE INVENTION

The present invention is particularly adapted for long overhang railway flatcar having a long coupler shank mounted or relative lateral swinging movement within a center sill structure, and includes a coupler positioning device employing an elastomeric shear member which is operatively connected to a truck. The positioning device facilitates coupling of long length cars on curved track and tends to maintain the couplers in a proper position for coupling to minimize bypassed couplings. The lower surface of the elastomeric member is operatively connected to the wheeled truck and moves laterally with the pivoting of the truck relative to the car body or center sill structure. The upper surface of the elastomeric member is connected to the coupler shank for lateral movement with the coupler. Thus, upon the pivoting of the truck when the railway car negotiates a curve, the coupler is urged by the elastomeric member to a longitudinally aligned position with respect to the truck.

A cable connects the truck to the lower portion of the elastomeric member and the coupler is then steered by the truck through the cable. In the event the railway car is on a straight portion of track and is coupled to a car on a curved track portion, the elastomeric member permits the coupler to swing against the bias of the elastomeric member. In the event it is desired to move the coupler manually for coupling on curves and the like, the cable may be operatively disconnected from the elastomeric shear member to permit the coupler and elastomeric member to be moved manually relative to the truck and the center sill structure without any shear deflection of the elastomeric member.

The invention accordingly comprises the constructions hereinafter described, the scope of the invention being indicated in the following claims. In the accompanying drawings, in which one of various possible embodiments of the invention is illustrated, FIG. 1 is a top plan, certain parts broken away, of an end portion of a railway flatcar having the coupler positioning structure comprising the present invention thereon;

FIG. 5 is a section taken generally along line 5—5 of FIG. 1;

FIG. 6 is a section generally similar to FIG. 5 but showing the elastomeric member deflecting in shear upon movement of the coupler out of longitudinal alignment with the truck and car body;

FIG. 7 is a section similar to FIG. 5 but indicating the elastomeric member disconnected from the truck and moving freely with the coupler;

FIG. 8 is an enlarged side elevation of means for disconnecting the elastomeric member from the truck;

Figure 1:
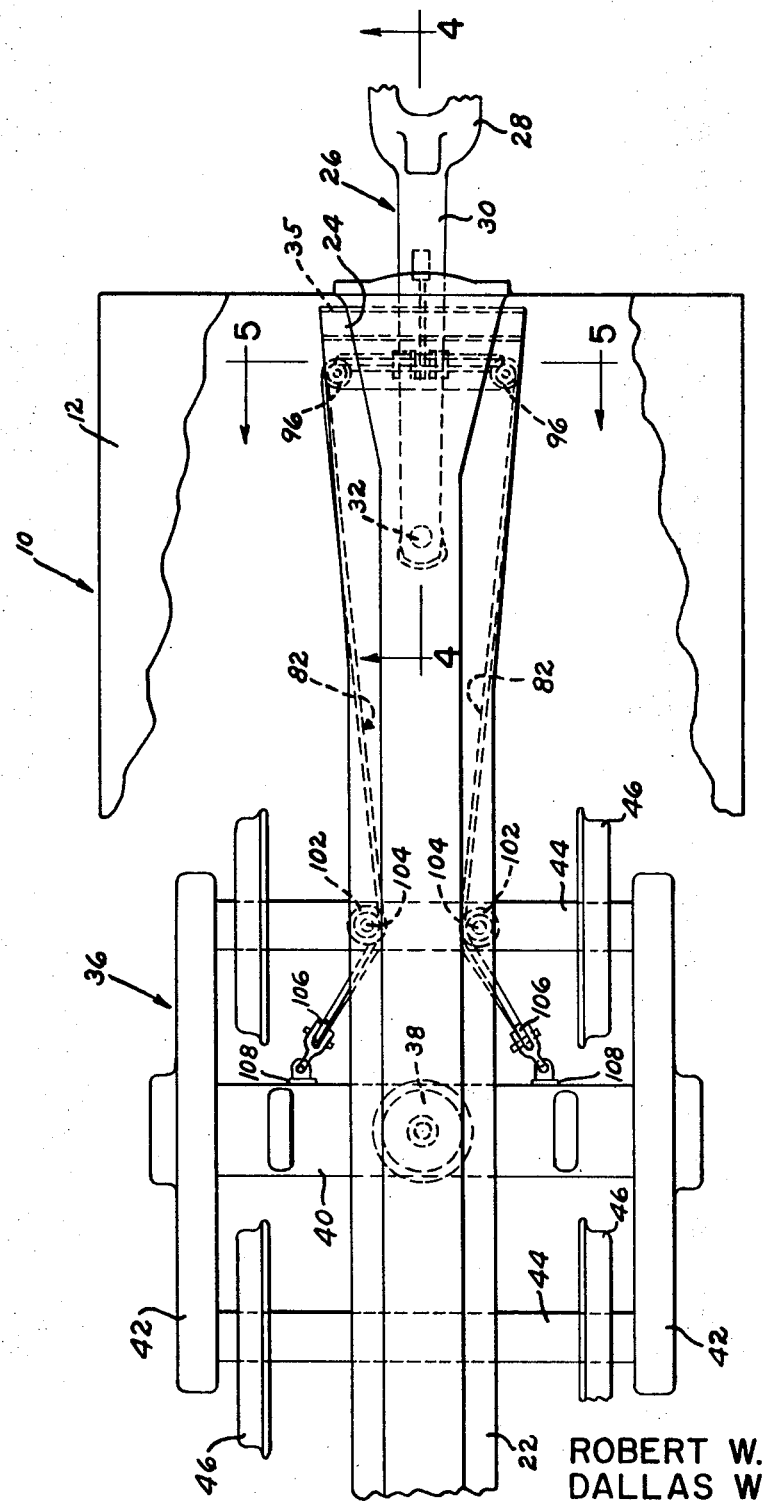
Figure 3:
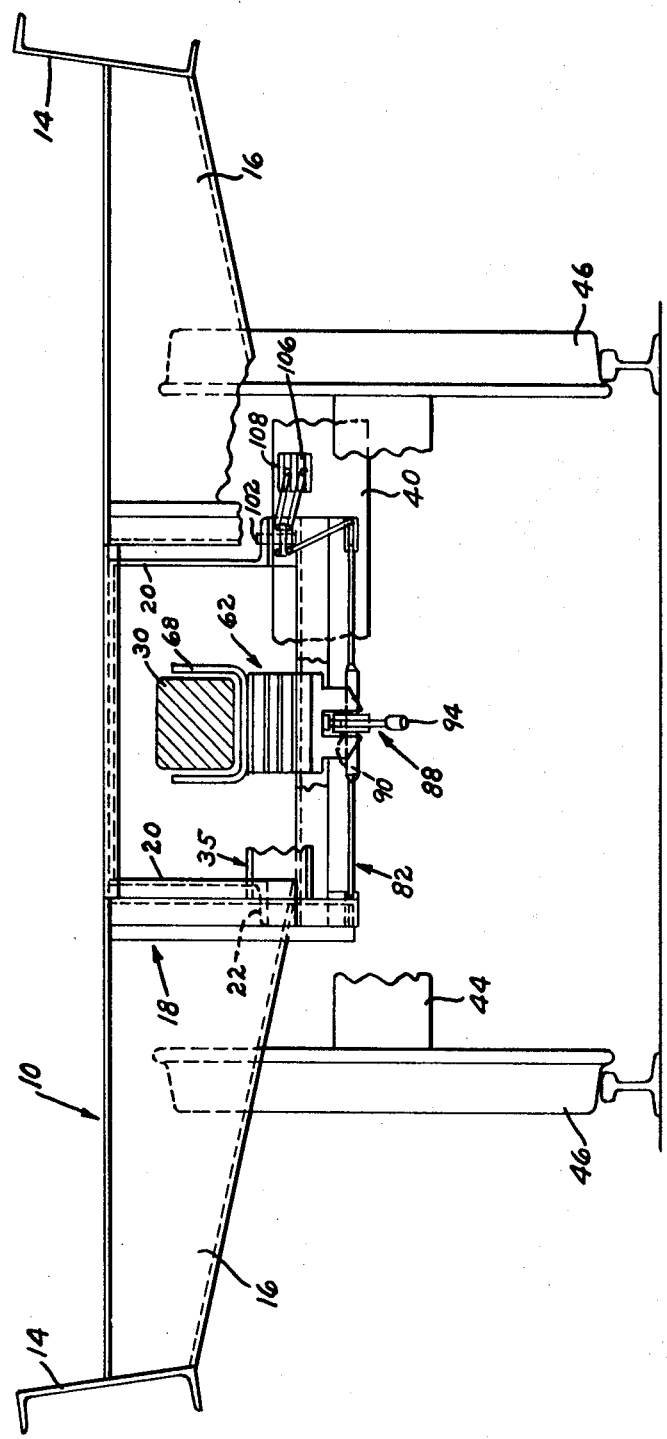
FIG. 3 is an end elevation of the railway car illustrated in FIGURES 1 and 2.
Figure 2:
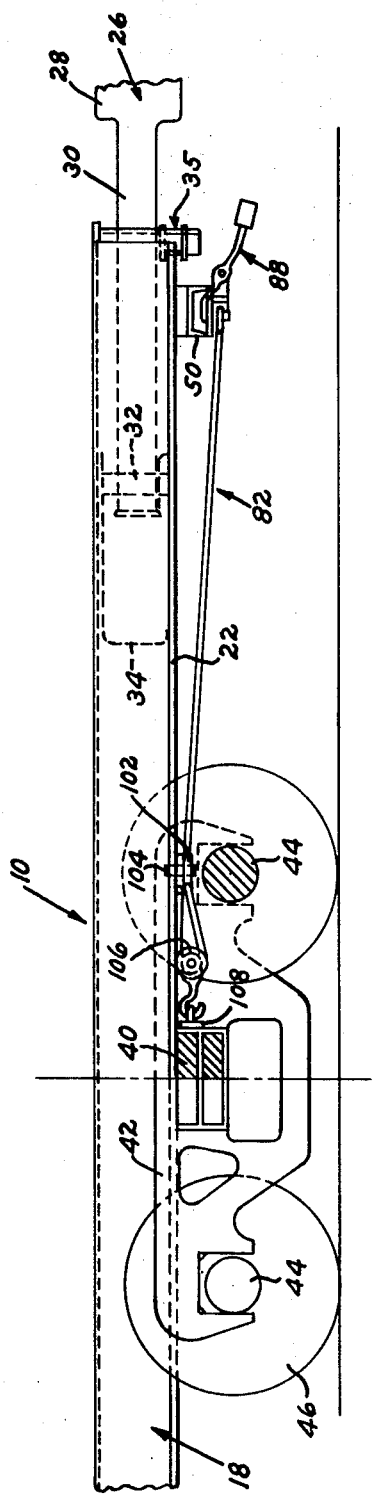
FIG. 2 is a side elevation, certain parts broken away, of the end portion illustrated in FIG. 1.

FIG. 9 is a top plan similar to FIG. 1 but showing the truck and coupler pivoted relative to the car body; and FIG. 10 is a section taken generally along line 10—10 of FIG. 9 illustrating the elastomeric member deflecting in shear while the coupler is out of centered position with respect to the center sill. Referring now to the drawings for a better understanding of the invention, a flatcar is generally indicated 10 having a deck 12 with a side sill 14 extending along each side thereof. An end sill 16 extends transversely of the car between side sills 14 and a center sill structure generally indicated 18 extends the length of railway car 10. Center sill structure 18 includes a pair of vertical webs 20 having lower horizontal flanges 22. The outer end 24 of center sill structure 18 is flared outwardly as shown in FIGS. 1 and 9. Mounted within the flared open end 24 is a long shank coupler generally indicated 26. Coupler 26 includes a coupler head 28 and a coupler shank 30. Coupler shank 30 is mounted for pivotal swinging movement about pivot pin 32 which connects coupler shank 30 to a yoke 34. Yoke 34 houses a suitable draft gear such as a plurality of rubber buff pads. Coupler 26 may swing about pivot pin 32 as much as around 15° in either direction from its centered position with respect to center sill 18. Extending across the mouth of flared end 24 is a box-shaped coupler carrier generally indicated 35 and secured to the outwardly flared vertical webs 20 of center sill 18. Coupler shank 30 is normally spaced around ⅝ inches from coupler carrier 35 and coupler carrier 35 acts as a stop to limit the downward movement of coupler shank 30. A truck is generally indicated at 36 and includes a center plate 38 mounted on a truck bolster 40. Side frames 42 are mounted on axles 44 having wheels 46 secured thereon.

Figure 4:
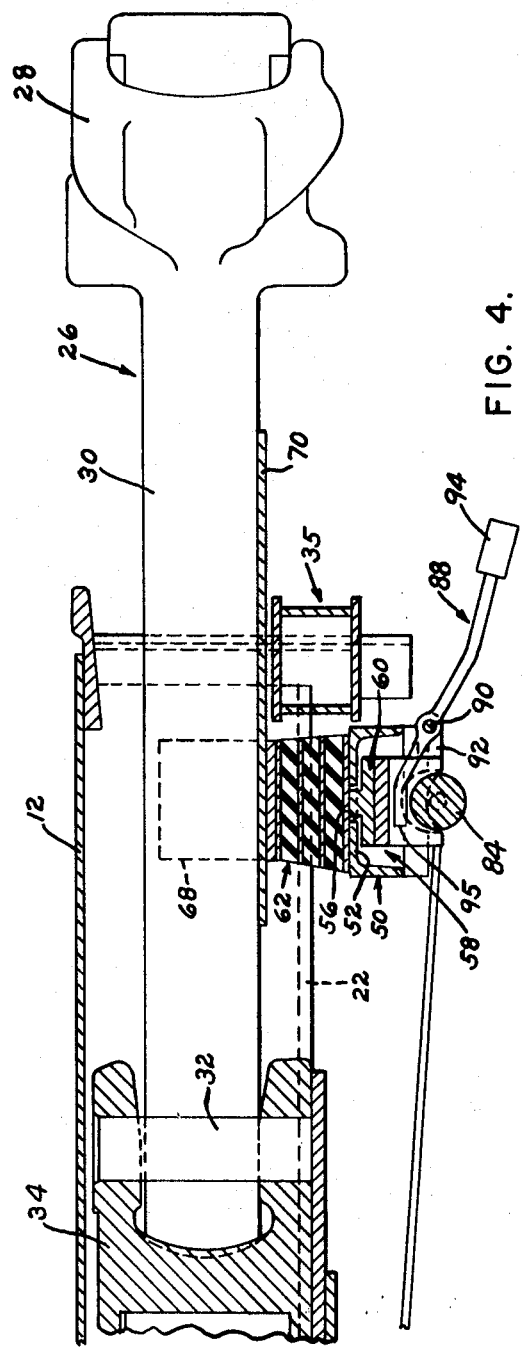
FIG. 4 is a longitudinal section taken generally along line 4—4 of FIGURE 1.

Referring to FIGS. 4, 5 and 8, a channel-shaped support member generally indicated 50 is secured beneath center sill structure 18 adjacent coupler carrier 35. Support 50 has an upper web 52, and a clip angle 54 adjacent each end thereof is welded to the adjacent lower flange 22 of center sill structure 18 for securing support 50 thereto. Web 52 has an elongate slot 56 extending transversely of the car.

A movable base 58 has a guide 60 on its upper surface fitting within slot 56. Elastomeric member generally indicated 62 has a lower plate 64 welded to guide 60 and moving with base 58. Upper plate 66 of elastomeric member 62 has a U-shaped holder 68 which receives coupler shank 30, and a wear plate 70 secured to the underside of shank 30 contacts holder 68. Thus, upon any swinging movement of coupler 26, U-shaped holder 68 and upper plate 66 of elastomeric member 62 move therewith. Intermediate plates 72 are bonded to rubber shear members 74 which are arranged between plates 64, 66 and 72 to provide an elastomeric shear pad which will deflect in shear as much as around 8 inches.

Extending downwardly from base 58 are a pair of spaced lugs 76 forming a slot 78 therebetween. Each lug 76 has a downwardly opening arcuate groove 79 therein. Groove 79 for each lug 76 has a surface sloping upwardly from slot 78. A steering cable generally indicated 82 has a stop 84 secured thereon which is normally positioned in slot 78 between spaced lugs 76. Cable 82 has an enlarged reinforced portion 86 adjacent each side of stop 84. A cable release is provided comprising a manually actuated handle generally indicated 88 which is pivoted at 90 on spaced extensions 92 projecting outwardly from lugs 76. End 94 may be manually gripped to pivot handle 88 and the other end 95 rests in contact with the upper surface of stop 84. Thus, upon an upward pivoting of handle 88, stop 84 and cable 82 are moved downwardly until the upper surface of stop 84 is adjacent grooves 79. In this position, base 58 may be laterally moved manually by moving the coupler with the adjacent lug 76 passing over stop 84. Upon release of handle 88, cable 82 moves upwardly under bias of a resilient cable tensioning means toward the surfaces defining grooves 79. Upon a movement of base 58 back to a centered position with respect to the longitudinal axis of center sill structure 18, a downward camming movement of cable 82 is effected by stop 84 contacting the surface defining adjacent groove 79 and moving within slot 78. When stop 84 clears the adjacent lug 76, the tension in cable 82 will return stop 84 to its upper position within slot 78 between lugs 76. In this position, base 58 is restrained by cable 82 against lateral movement with coupler shank 30 unless truck 36 pivots with the swinging movement of coupler 26.

To support and guide cable 82, pulleys 96 are mounted about vertical axes 98 on cross support members 100 secured to the legs of channel-shaped support 50. Cable 82 extends from pulleys 96 to pulleys 102 which are mounted about vertical axes 104 secured to flanges 22 of center sill structure 18. Cable 82 then extends about pulleys 106 anchored at 108 to truck bolster 40. The ends of cable 82 are anchored at 108 to the underside of flange 22 adjacent pulley 102. For maintaining the tension in cable 82 one of pulleys 92 may be spring loaded.

Referring to FIGS. 9 and 10, truck 36 on curved track T is pivoted relative to the center sill structure 18, and coupler 26 is held by an interlocking coupler C on an adjacent car out of longitudinal alignment with center sill structure 18. Cable 82 moves with truck 36 and pulls base 58 and lower plate 64 of elastomeric member 62 to the position illustrated in FIG. 10 whereby elastomeric member 62 deflects in shear.

Referring to FIG. 6, truck 36 is in longitudinal alignment with center sill structure 18 while coupler 26 is pivoted out of centered position with respect to center sill structure 18 thereby deflecting elastomeric member 62 in shear.

However, when coupling on a curved track, coupler 26 will generally be centered with respect to the track since truck 36 will move coupler 26 through cable 82. This minimizes the bypassing of couplers when coupling on curves and the like.

What is claimed is:

1. In a railway car, a center sill structure, a wheeled truck mounted beneath the center sill structure for relative pivotal movement, a coupler mounted within the center sill structure for relative swinging lateral movement away from centered position with respect to the longitudinal axis of the center sill structure, a resilient elastomeric member generally beneath the shank of the coupler and having vertically spaced upper and lower surfaces, means connecting the upper surface of said elastomeric member for lateral movement with the shank of the coupler, and means connecting the lower surface of said elastomeric member for lateral movement with the wheeled truck upon pivoting of the truck relative to the center sill structure whereby relative lateral movement of either the coupler shank or the wheeled truck effects deflection of the elastomeric member in shear.

2. In a railway car, a center sill structure, a wheeled truck mounted beneath the center sill structure for relative pivotal movement, a coupler mounted within the center sill structure for relative swinging lateral movement away from centered position with respect to the longitudinal axis of the center sill structure, a resilient elastomeric member in supporting relation generally beneath the shank of the coupler and having vertically spaced upper and lower surfaces, means connecting the upper surface of said elastomeric member for lateral movement with the shank of the coupler, a cable operatively connected to said truck and to the lower surface of said elastomeric member, and pulleys guiding and supporting the cable between the truck and lower surface of the elastomeric member for movement of the cable with the truck upon pivoting of the truck relative to the center sill structure whereby relative lateral movement of either the coupler shank or the wheeled truck effects deflection of the elastomeric member in shear.

3. In a railway car, a center sill structure, a wheeled truck mounted beneath the center sill structure for relative pivotal movement, a coupler mounted within the center sill structure for relative swinging lateral movement away from centered position with respect to the longitudinal axis of the center sill structure, a coupler carrier adjacent the end of the center sill structure beneath the coupler shank, a support secured to the center sill structure inwardly of the coupler carrier and beneath the coupler shank, a resilient elastomeric member mounted on said support beneath the shank of the coupler and having vertically spaced upper and lower surfaces, means connecting the upper surface of said elastomeric member for lateral movement with the shank of the coupler, and means connecting the lower surface of said elastomeric member for lateral movement with the wheeled truck relative to said support upon pivoting of the truck relative to the center sill structure whereby relative lateral movement of either the coupler shank or the wheeled truck effects deflection of the elastomeric member in shear.

4. In a railway car, a center sill structure, a wheeled truck mounted beneath the center sill structure for relative pivotal movement, a coupler mounted within the center sill structure for relative swinging lateral movement away from centered position with respect to the longitudinal axis of the center sill structure, a coupler carrier adjacent the end of the center sill structure beneath the coupler shank, a support secured to the center sill structure inwardly of the coupler carrier and beneath the coupler shank, a resilient elastomeric member mounted on said support beneath the shank of the coupler and having vertically spaced upper and lower surfaces, means connecting the upper surface of said elastomeric member for lateral movement with the shank of the coupler, a cable operatively connected between the lower surface of said elastomeric member and said truck, and pulleys guiding and supporting the cable for movement of the cable with the truck upon pivoting of the truck relative to the center sill structure whereby relative lateral movement of either the coupler shank or the wheeled truck effects deflection of the elastomeric member in shear. with the truck upon pivoting of the truck relative to the center sill structure whereby relative lateral movement of either the coupler shank or the wheeled truck effects deflection of the elastomeric member in shear.

5. In a railway car as set forth in claim 4, said elastomeric member comprising a shear pad having a plurality of horizontally spaced metal plates and rubber bonded to the plates.

6. In a railway car as set forth in claim 4, a base for said elastomeric member secured to the lower surface of the elastomeric member, said cable being operatively connected to said base for lateral movement of the base and lower surface of the elastomeric member with the cable.

7. In a railway car as set forth in claim 6, means for releasably disconnecting the cable from the base, and means for manually moving the base and elastomeric member secured thereto laterally of the car upon disconnecting of the cable from the base, said coupler being moved laterally with the elastomeric member.

8. In a railway car as set forth in claim 6, said support having an elongate slot therein extending generally transversely of the car, said base having a guide extending within said slot for guiding the lateral movement of the base and lower surface of the elastomeric member.

PO-1050
(5/69)

UNITED STATES PATENT OFFICE
CERTIFICATE OF CORRECTION

Patent No. 3,610,435          Dated Oct. 5, 1971

Inventor(s) Robert W. Randolph and Dallas W. Rollins

It is certified that error appears in the above-identified patent and that said Letters Patent are hereby corrected as shown below:

Column 1, line 7, after "abandoned" insert -- , --; line 28, "or" should be -- for --. Column 4, lines 43-46, after the period, cancel "with the truck --- member in shear."

Signed and sealed this 28th day of March 1972.

(SEAL)
Attest:

EDWARD M. FLETCHER, JR.
Attesting Officer

ROBERT GOTTSCHALK
Commissioner of Patents